Nov. 28, 1961  M. L. HASELTON ET AL  3,011,153
COMPATIBLE TICKER AND AUTOMATIC QUOTATION BOARD SYSTEM
Filed May 23, 1956  11 Sheets-Sheet 1

NOTE
BLACK BLOCKS INDICATE "MARKING" IMPULSES
WHITE BLOCKS INDICATE "SPACING" IMPULSES
▲ FRACTIONAL VALUES IN EIGHTS

INVENTORS
M.L. HASELTON
G.L. BUSH
BY
ATTORNEY

Nov. 28, 1961   M. L. HASELTON ET AL   3,011,153
COMPATIBLE TICKER AND AUTOMATIC QUOTATION BOARD SYSTEM
Filed May 23, 1956   11 Sheets-Sheet 5

INVENTOR.
M.L. HASELTON
G.L. BUSH
BY
ATTORNEY

INVENTOR.
M.L. HASELTON
G.L. BUSH
BY
ATTORNEY

United States Patent Office 3,011,153
Patented Nov. 28, 1961

3,011,153
COMPATIBLE TICKER AND AUTOMATIC
QUOTATION BOARD SYSTEM
Merton L. Haselton, Rye, N.Y., and George L. Bush, Springdale, Conn., assignors to The Teleregister Corporation, Stamford, Conn., a corporation of Delaware
Filed May 23, 1956, Ser. No. 586,774
10 Claims. (Cl. 340—154)

This invention relates to a system for automatic data posting and more particularly to a device for displaying in brokers' offices a tabulated sequence or trend of current market prices of commodities or other items concurrently with the printing of such prices on ticker tapes.

Automatic quotation boards in common use are operated by means of communication circuits, which are separate and unrelated to the ticker systems, resulting in a duplication of quotation price transmissions. In accordance with our invention a display system and apparatus is provided which is capable of operating at speeds greatly in excess of systems based on electromechanical techniques such as relays, motor driven rotating distributors, and step-by-step drum indicators. The stop-start ticker signals are received character by character, at the normal rate of 500 per minute, by means of a high speed electronic distributor, and are decoded at the same rate by a novel magnetic core arrangement to select the desired groups of display devices and to effect the price posting at speeds which impose no restraint on the ticker signals.

By these means a system for commodity price posting is provided which is compatible with existing ticker systems and thereby provides substantial economies in communication facilities, repeaters, and terminal equipments.

One of the objects of the invention is to provide a device which will effect posting automatically from the same telegraphic code signals which are transmitted from exchanges or trading centers over ticker communication nets to a large number of remote offices where brokers or customers are interested in watching the trend of representative prices.

Another object is to enable prices to be automatically tabulated and posted on a display board at a speed which is substantially faster than the normal speed of transmission of ticker prices to the end that the decoding and switching devices will require a minimum of buffer storage or overlap functions to accept and process the ticker signals in the sequence and at the rate transmitted.

A further object is to produce control and switching circuits for an electric posting board with a minimum of electromagnetic relays and relay contacts by using magnetic switching cores and electronic techniques and devices which are extremely fast and require few adjustments during their useful life.

Additionally, an object is to provide means for posting on any one board only those ticker item prices which have been predetermined to be of interest at that particular location and for rejecting other non-posted items including spurious or administrative word messages.

Still another object is the provision of a system of the character disclosed in which an adequate number of consecutive last prices in regard to each item posted is continuously displayed and kept up to date currently during market sessions to give a significant indication of the current trend of the item. More particularly, such a trend to be of practical utility should comprise at least three consecutive prices and preferably four or more.

Other objects and advantages of the invention will appear hereinafter.

The disposition of the various equipments and the manner of performance of the various functions will best be understood by reference to the accompanying drawings in which.

Figure 3:
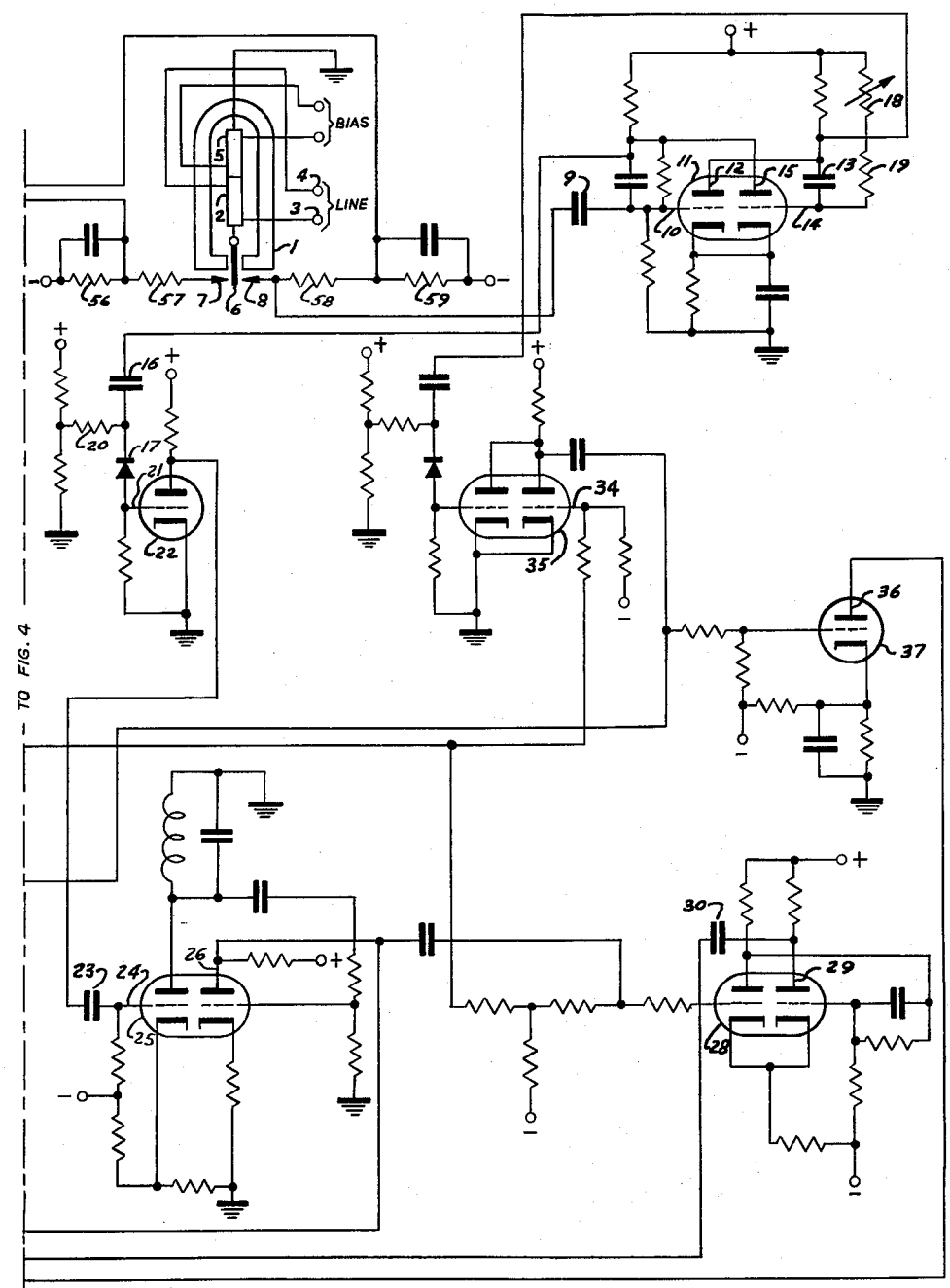
Figure 4:
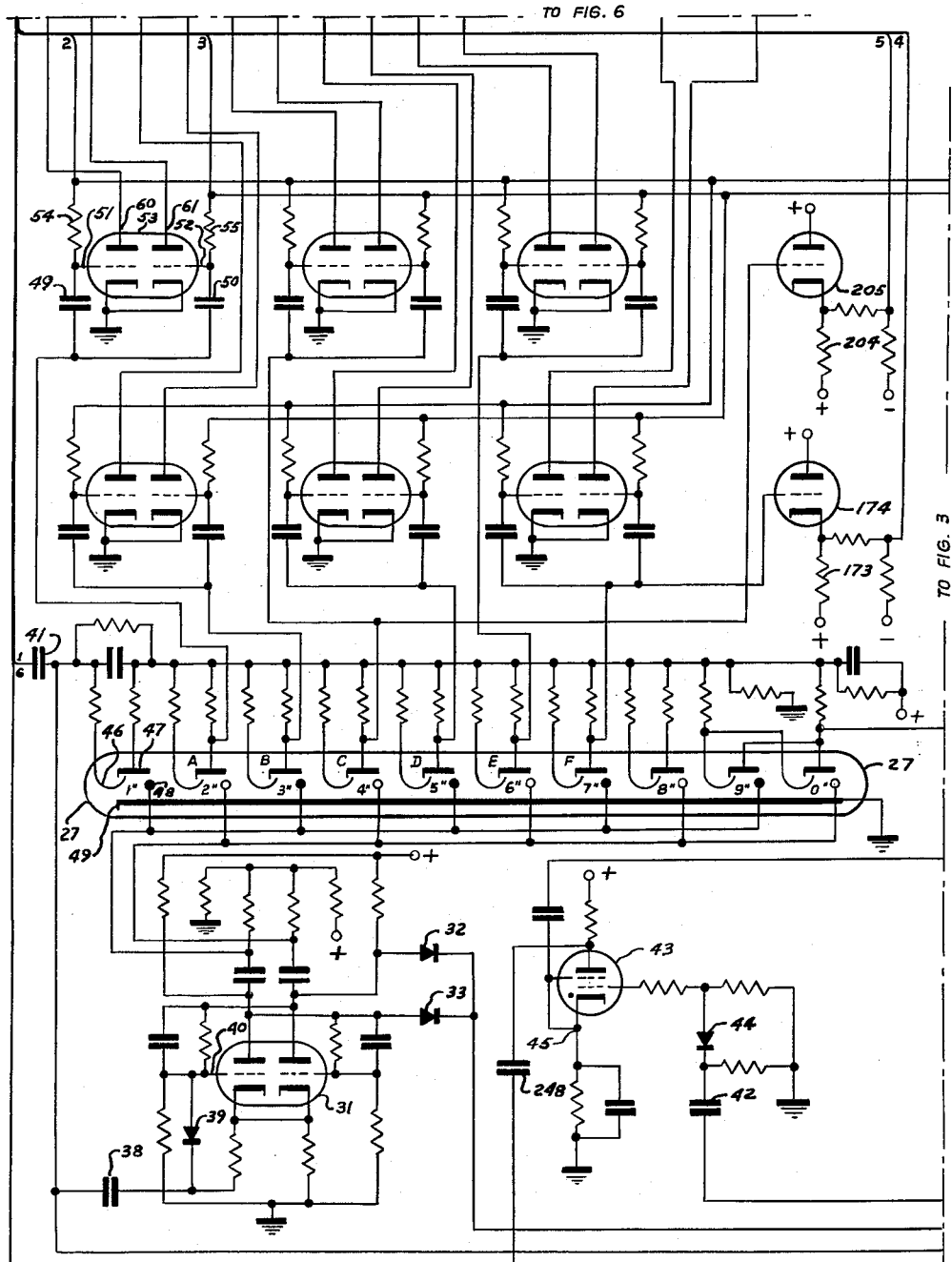
Figure 5:
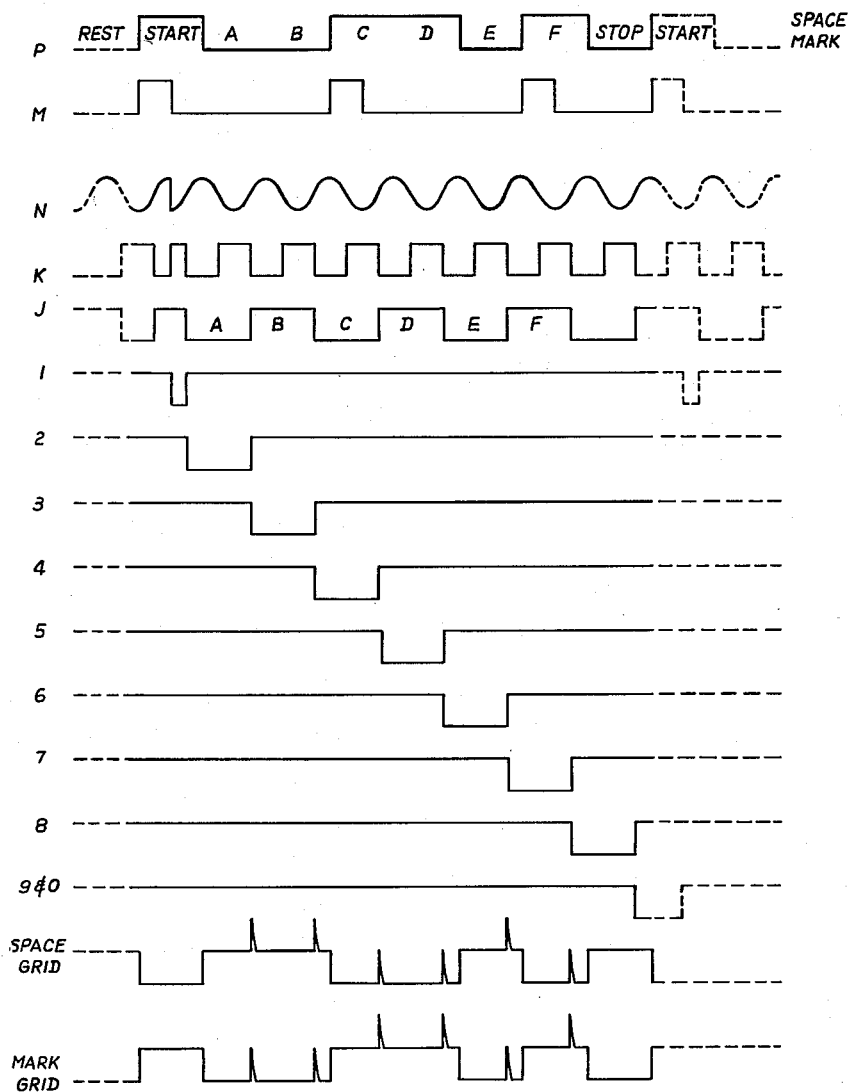
Figure 6:
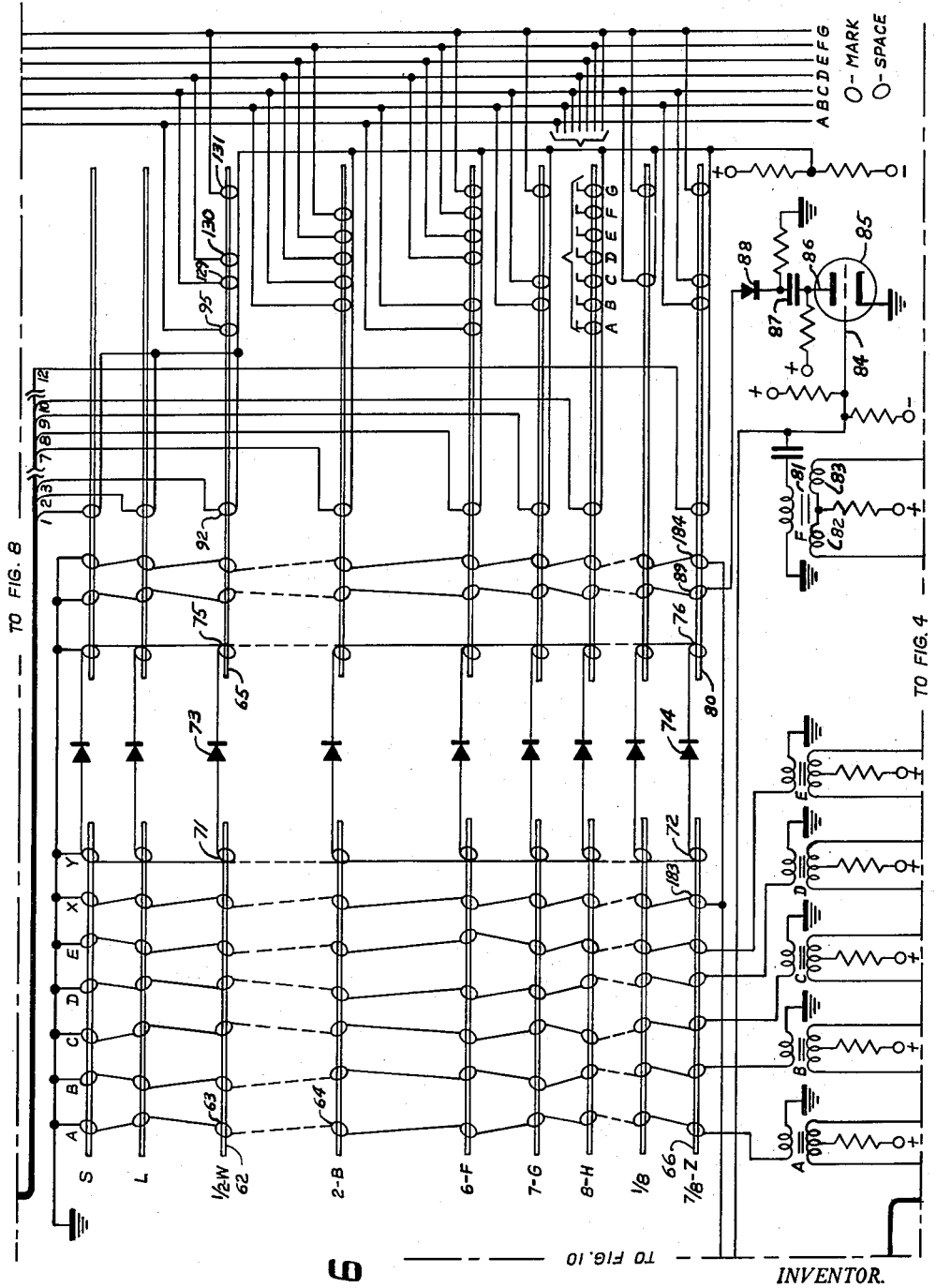
Figure 7:
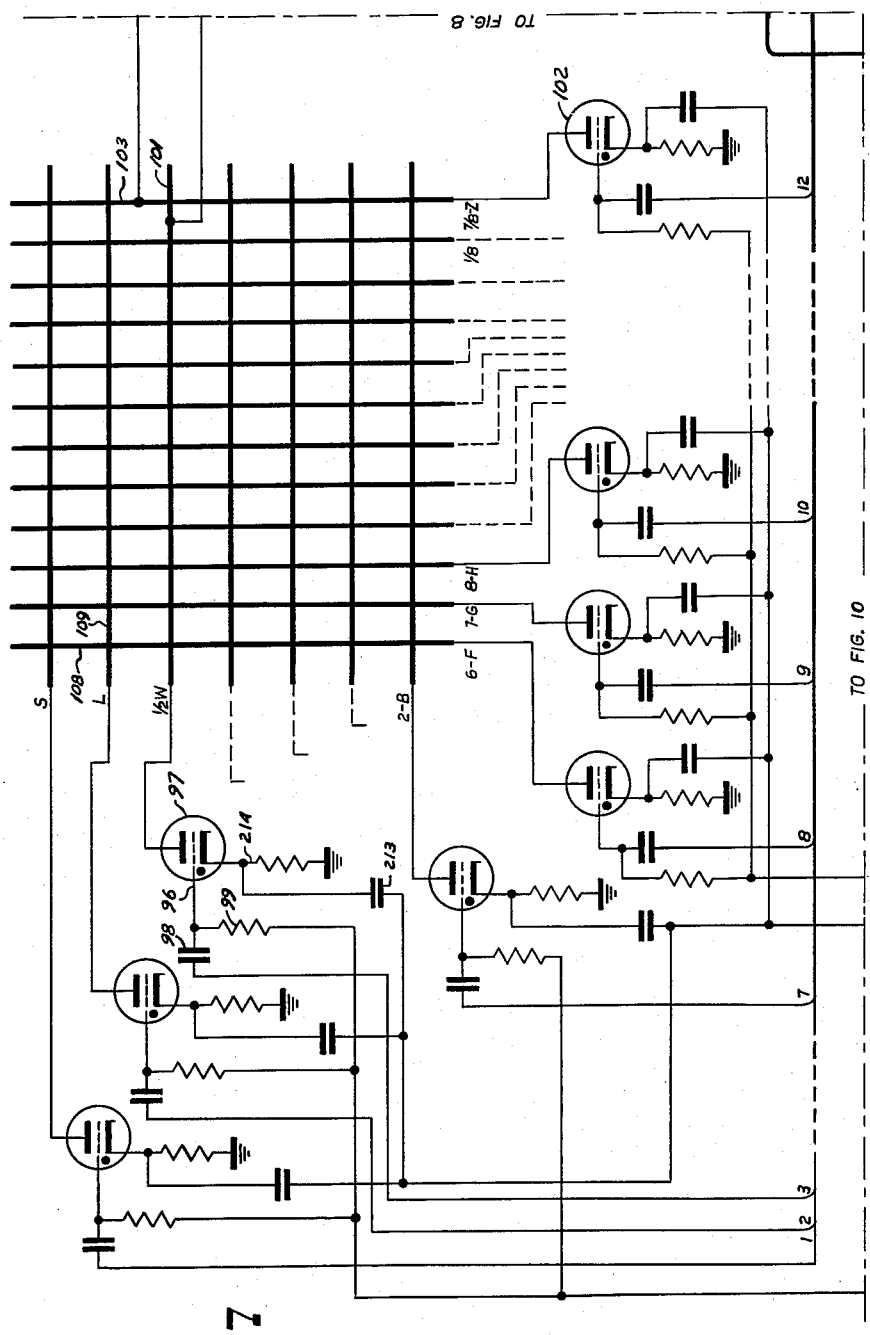
Figure 8:
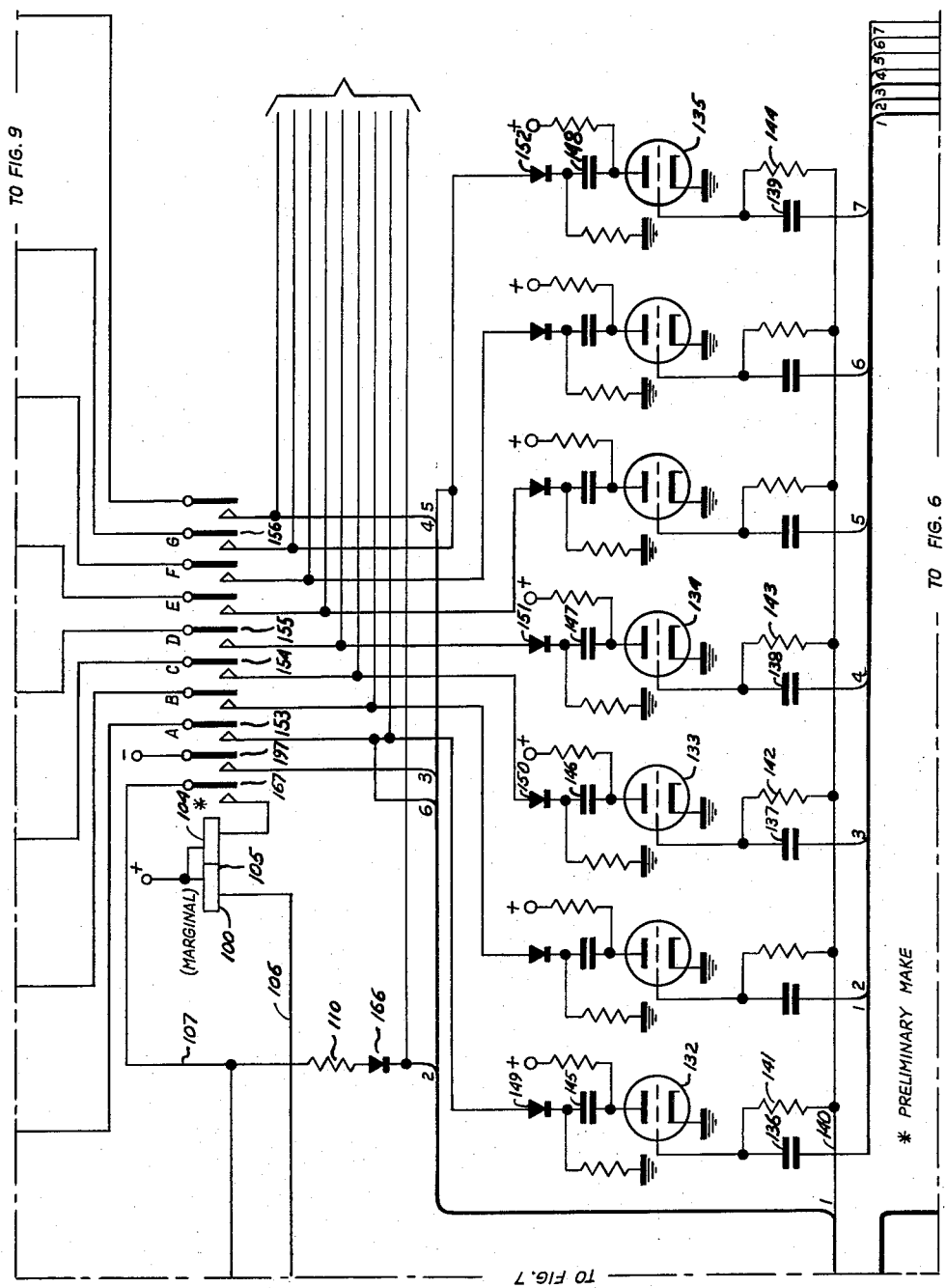
Figure 9:
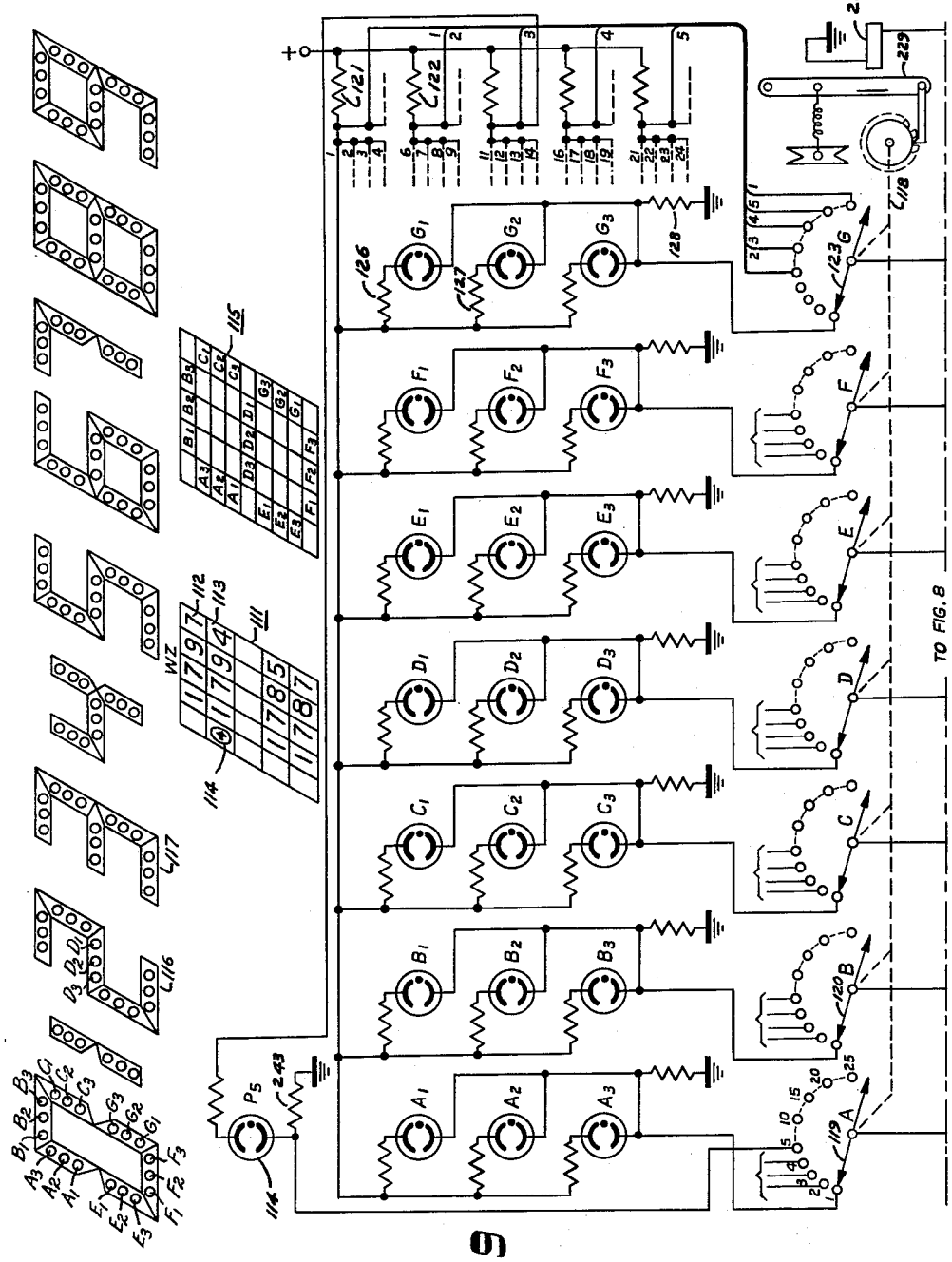
Figure 10:
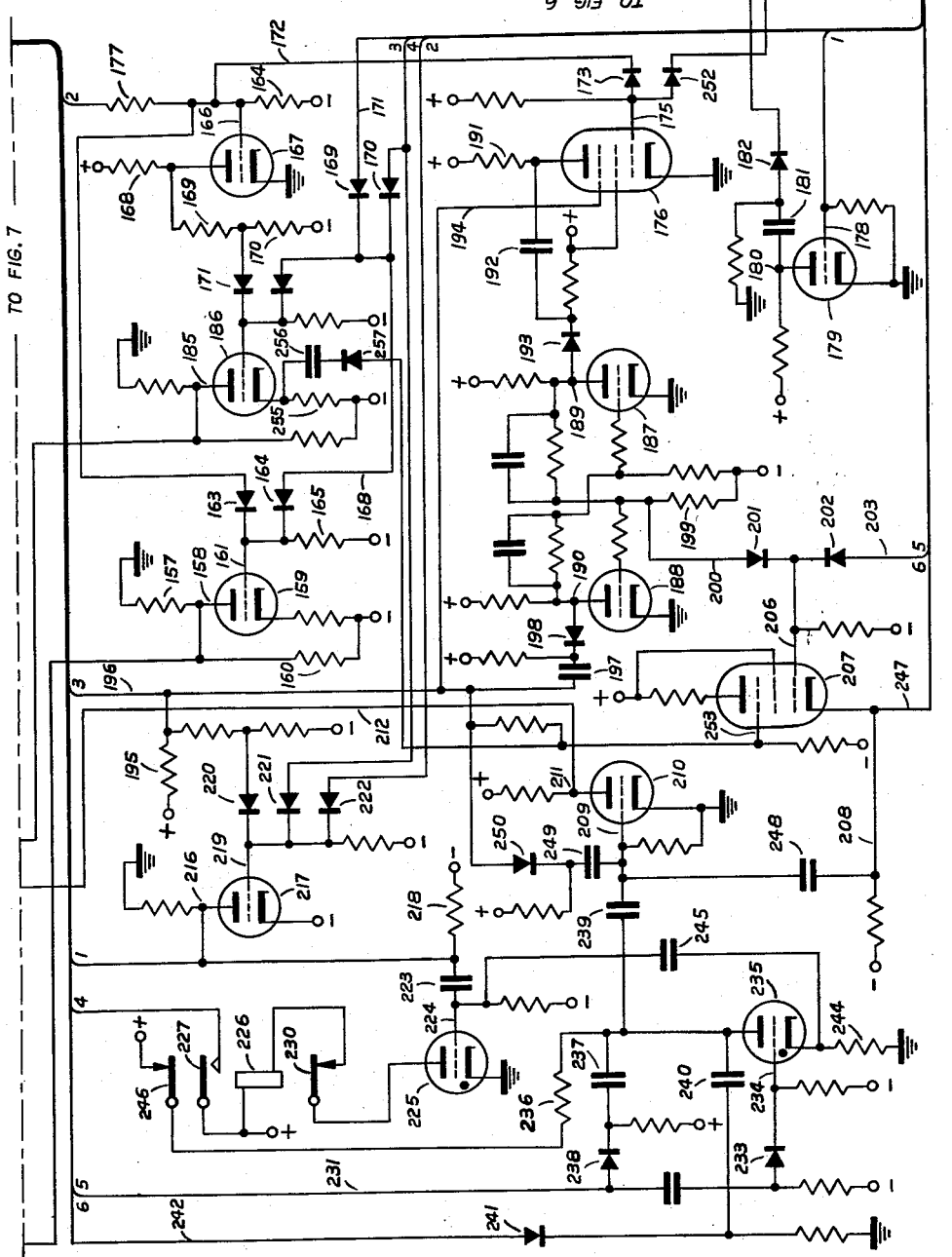
Figure 11:
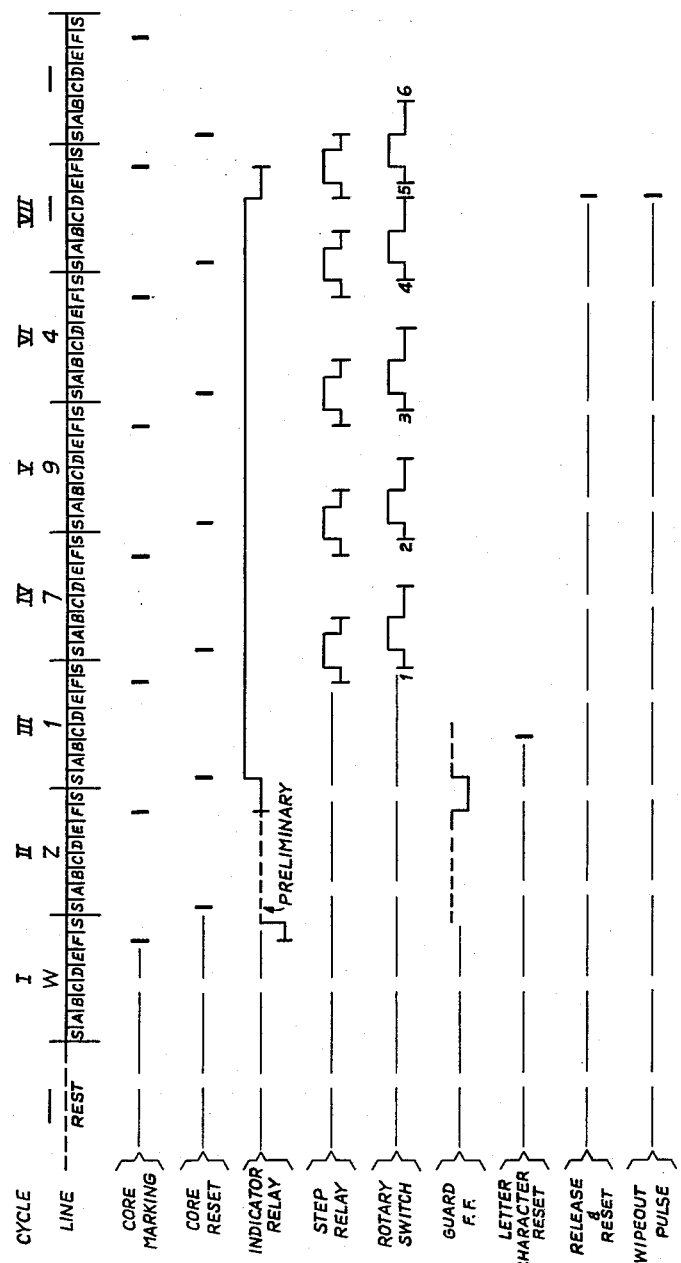

FIGS. 3 and 4 together comprise a circuit diagram of the electronic receiving distributor in which the synchronizing speed control is provided by a stable ringing circuit oscillator and the switching is performed under control of a magnetic beam switching tube;

FIG. 5 is a timing diagram indicating the form and time relationship of currents and voltages in the circuits of the receiving distributor and associated circuits;

FIG. 6 shows schematically the code reader and translator based on the use of magnetic cores with multiple windings;

FIG. 7 indicates the circuits and the disposition of equipments for the initial functions of selecting the commodity option price indicators corresponding to the printed symbols on the ticker tape, which circuits include provision for dual cross-connections for interchanging the assignment of indicator groups to the various posted options;

FIG. 8 is a schematic circuit of the indicator group selector relay circuits which also includes the price digit resetting circuits between the translator and the individual option indicator groups;

FIG. 9 illustrates the preferred type and arrangement of price digit indicators to display the four most recent prices or quotations on an item or commodity option;

FIG. 10 comprises the programming circuits which control the overall timing and sequence of all operations for the selection and posting functions which are initiated by the reception of ticker messages;

FIG. 11 is a timing diagram showing the relationship of the seven successive cycles of the receiving distributor in a complete selecting and posting sequence;

FIG. 12 is a perspective view of two toroidal cores and associated windings of the code reader and translator shown in FIG. 6; and FIG. 13 is a block diagram showing how FIGS. 3, 4, and 6 to 10 of the drawings may be joined to disclose the circuit connections.

It will be understood that for purposes of the following description the commodity prices, which are transmitted by the familiar teletype ticker "stop-start" codes, appear on the tapes in the following general format:

--WZ          --WU          --CZ
  179½         197¼          126¼

In the above example the commodity wheat is signified by the letter abbreviation (W) and the month or "option" by the letter (Z) meaning December. Thus the first notation in the tape indicates that wheat for December delivery sold at $1.79½ per bushel.

The operation of the ticker is controlled by combinations of circuit impulses of two polarities transmitted over the line conductor to which the printer is connected. All of the operations of the printer are initiated by and the characters to be printed are determined by movement of the armature of a polarized magnet actuated by the line impulses. In like fashion the functions of the price posting system to be described are initiated by and are controlled by the polar relay armature, the major variations in the functions of the printing and posting residing in the utilization of a group of characters in the posting operation whereas the printing takes place character by character without reference to context.

The signalling code employed to transmit characters over a high speed ticker circuit consists of six selecting pulses (designated A to F in FIG. 1) used in various combinations of "marking and spacing" intervals; as received at the stock printer or ticker, a marking signal is represented by negative polarity, and a spacing signal by positive polarity. Each group of six selecting pulses is preceded by a start pulse (spacing) and followed by a stop pulse (marking) to maintain unison between the transmitting apparatus and the receiving equipments, either printers or posters, so that each character comprises an eight unit code which includes six selection pulses.

The most commonly used commodity and option abbreviation characters are listed for reference as follows:

| Soy beans | S | Jan. | F | July | N |
|---|---|---|---|---|---|
| Lard | L | Feb. | G | Aug. | Q |
| Wheat | W | Mar. | H | Sept. | U |
| Corn | C | Apr. | J | Oct. | V |
| Oats | O | May | K | Nov. | X |
| Rye | R | June | M | Dec. | Z |
| Barley | B | | | | |

Figure 1:
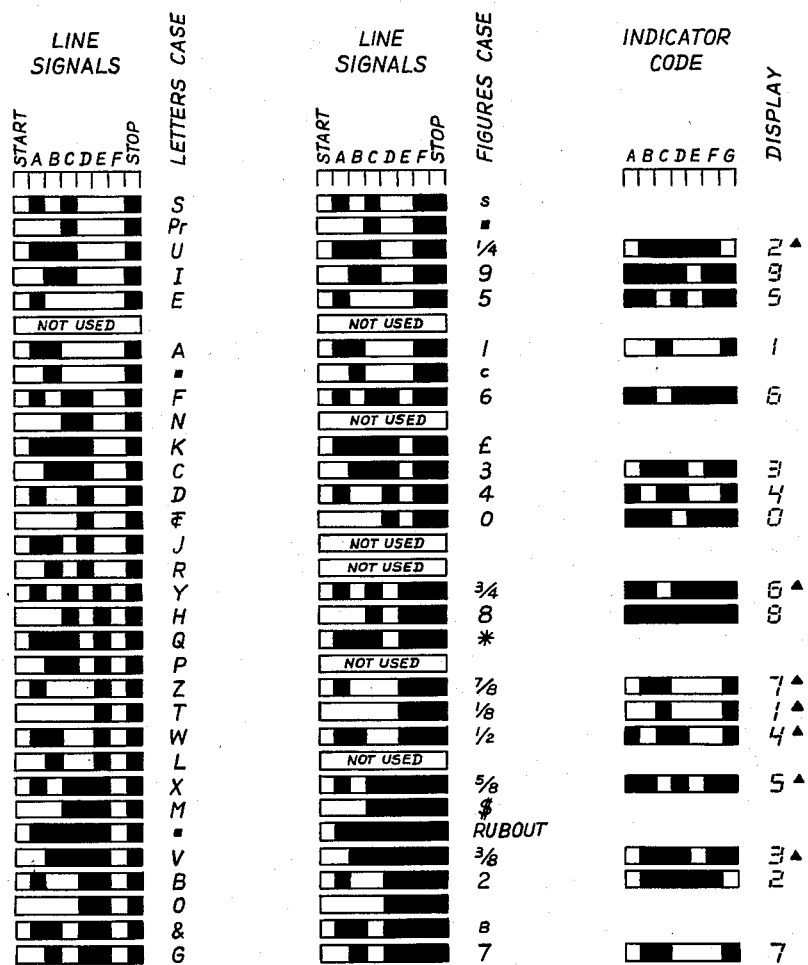
FIG. 1 shows three code charts depicting in time relationship the electric current pulses comprising the stop-start line signals for the alpha-numerical characters which are most commonly used for operation with high speed typewheel ticker printers employing an eight unit permutation code, and also a corresponding seven element indicator code for posting the numerical values.

The ticker transmission codes corresponding to the above letters and to the price digits including fractions in eighths may be determined by reference to FIG. 1. It should be noted that the figures characters, i.e., the figures case or digit codes, invariably include marking, or "shift," pulses in the sixth selection pulse position whereas for the letters characters the sixth position invariably is "spacing."

It will now be demonstrated how a sequence of two significant letter codes representing a commodity option, WZ-December Wheat, for example, are utilized to select and switch a corresponding group of price indicators into operative relationship with the following price signals and a preferred arrangement for posting a sequence of several consecutive prices for a commodity option thus selected.

Figure 2:
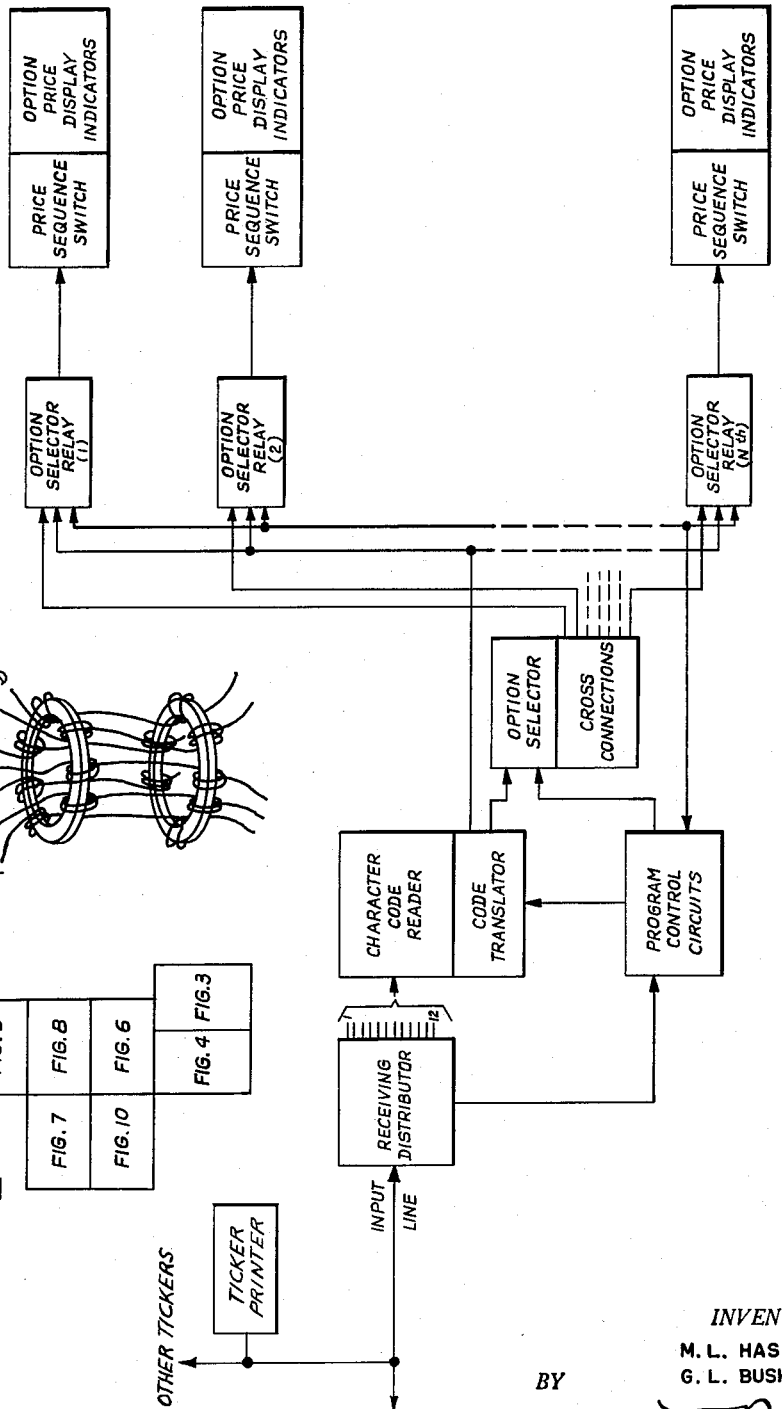
FIG. 2 is a schematic block diagram of the equipments and circuits of the complete commodity price trend posting system showing the principal functional components; and including a manually changeable cross connections arrangement such as a crossbar interconnector.

Referring now to FIG. 2, the posting board system comprises the following principal components:

(a) A Receiving Distributor, operating on the well known stop-start principle but of novel construction, for converting the serial input marking and spacing line impulses into a parallel output on six pairs of leads and generating additionally two timing output signals for "local" control of the switching program in unison with received ticker signals.

(b) A letter Character Code Reader for decoding letter combinations which have functional significance in the posting board operations. This code reader comprises a magnetic core matrix with an original design of coil connections for recognizing each significant sequence of two letters and marking two output selection circuits; a first of which corresponds to the selected one of seven commodity letter abbreviations and the second corresponding to the selected one of twelve option letter abbreviations.

(c) A Code Translator which combines with the code reader to translate the incoming six ticker price code pulses to a parallel seven-element output indicator code; this indicator code being so composed, as shown in the right hand chart of FIG. 1, as to selectively fire neon lamps in the digit indicators in combinations to form in modified matrix fashion visual readable numerals.

(d) A Cross Connections circuit for example a crossbar interconnector arrangement with an Option Selector for manually interchanging cross-connections of any option selection circuits to any desired indicator display group, comprising a series of seven "vertical" busses connected to the seven (or more if required) commodity designating output circuits from the code translator and a series of "horizontal" busses similarly connected to the code translator option designating circuits. It will be understood that this crossbar circuit configuration is schematic only in order to more clearly indicate that each "intersection" or cross-over represents a possible two-letter commodity option abbreviation as in the example to be described: WZ-December Wheat.

(e) A series of groups of Option Price Display Indicators, which groups may be variable in number to accommodate individual customers' requirements. Each display group in the preferred embodiment of the invention shown is arranged to post in sequence the four most recent prices of the commodity option—which four prices comprise what is commonly referred to in the trade as a price "trend," being of peculiar significance to commodity market traders. Each price in turn is composed of four digits of which three are integers and the remaining or fourth is a fraction, this fraction being represented also by an integral number up to and including seven, and which may be distinguished by a colored mask or window over the front of the indicator, it being understood that this fourth digit universally represents a fractional value in eighths.

(f) With each option display group of indicators there is an associated Price Sequence Switch for automatically routing successive incoming ticker price signals to the four adjacent digit indicators in a selected row of a selected option group, and to successive rows of indicators in turn to compose the trend as succeeding quoted prices of the option are received. Also associated with each indicator group is a multicontact relay for making the final circuit connections to the selected option group. For extinguishing the neon lamps in any row prior to resetting to new prices, a negative pulse is impressed on a common voltage-dropping resistor in the positive voltage supply circuit of the lamps in the next succeeding row in the trend sequence displayed. Thus there is at least one blank row of indicators in the total of five adjoining rows of any option group and the last price is always followed by a blank row in the sequence in which the successive prices of the option are received and displayed.

(g) Finally, Programming Control Circuits are provided for sequencing the operations of the various components and controlling the switching in correct time interrelationship and with incoming ticker line signals.

The detailed operation of the complete posting system will now be described.

*Receiving distributor*

Referring to FIG. 3 a polar relay 1 has one winding 2 connected in series with a source of ticker signals through terminals 3 and 4. The relay also has a bias winding 5 in accordance with well known constructions so that with a negative, or "marking," signal pulse on winding 2, the relay tongue 6 closes to the left hand contact 7 and with a positive, or "spacing," pulse the tongue swings over to contact 8.

By reference to the code chart FIG. 1 it will be seen that the "rest" or "stop" signal on the line is "marking" and we will accordingly start the description of the distributor operation with the tongue 6 closed to contact 7 and all other circuits in their normal or resting state.

Upon receipt of a "start" (spacing) signal the relay tongue 6 closes to contact 8 which abruptly increases the potential of contact 8 from a negative value, for example, 120 volts, to ground potential. This increase is transmitted through condenser 9 as a pulse to the grid 10 of tube 11, which is connected in monostable circuit arrangement as a "one shot" multivibrator, well known in the art. The positive going pulse on grid 10 triggers the multivibrator causing plate 12, normally held off, to conduct resulting in a drop of potential through the plate resistor. This negative going pulse is in turn transmitted through condenser 13 to grid 14 of tube 11 which turns off plate 15 allowing its potential to rise. The rise on plate 15 acts to sustain the positive potential at grid 10 but is ineffective in the output plate circuit condenser 16 due to the reverse current characteristics of diode 17. After an interval determined by the time constant of RC circuit condenser 13 and leakage resistances 18 and 19, the grid 14 becomes sufficiently positive to allow plate 15 to again conduct, which action causes the multivibrator to abruptly restore to its original stable state. This restoration time is adjustable by means of resistor 18 to occur at an interval equal to one-half of the incoming line pulse interval. Coincidentally with the restoration of the multivibrator the negative output pulse is differentiated by condenser 16 and resistance 20 and is passed in the back direction by diode 17 to grid 21 of tube 22 which is functionally designated as a ringing circuit driver, normally conducting. Upon the cutoff of tube 22 by the negative pulse on grid 21, a positive output pulse is transmitted through condenser 23 to grid 24 of tube 25, which is the start or trigger to the ringing circuit oscillator comprising the tuned LC circuit connected to the plate of the left hand triode of the tube 25. The amplified output of this ringing circuit from plate lead 26, a damped sine wave, is the basic timing and phasing signal for control of the multielement magnetic beam counter tube 27, FIG. 4, which is required to step sequentially in close synchronism with the incoming line signal pulses.

In order to more clearly define the time phase relationships of the above described functions reference is made now to FIG. 5. In this diagram the voltage excursions of polar relay spacing contact 8, FIG. 3, are indicated at P when receiving the code for the letter character W. Correspondingly the output of the multivibrator 11 is shown at M. The sine wave of the ringing oscillator plate output 26 is shown at N. By inversion and clipping at tube 28, FIG. 3, and associated circuitry, a squared wave K, FIG. 5, results which is equivalent in frequency to the incoming line pulse rate but out of phase therewith.

The negative edge of the squared output K from plate 29 of tube 28 is transmitted through condenser 30, and this signal is employed to drive a flip-flop binary counter circuit tube 31 through diodes 32 and 33, FIG. 4, providing alternate driving input couplings to the plates of the flip-flop. The square wave output J, FIG. 5, of this flip-flop, as will be evident from discussions to follow, is used to control the grids and thereby drive the magnetic beam counter switching tube 27, FIG. 4, in unison with the ringing oscillator which is time phased or synchronized at least once during each start-stop character interval as described below.

The operation of the magnetic beam counter switching tube will now be described. This tube may be of a type manufactured and sold under the trade name "Haydu." The tube contains ten identical arrays of spades 46, targets 47 and grids 48 symmetrically arranged around a central oxide-coated cathode 49, and included in an axial magnetic field. The detailed operation of this tube per se is well known in the art and also has been set forth in various published articles, for instance, in April 1956 "Electronics," by John Bethke. It is however to be noted that the grids are internally in two groups of five each termed "odd" and "even" and designated respectively by black and open dots. Then by alternate stepping of the flip-flop odd-even-odd, etc., the beam is made to advance from target to target one step for each pulse from the flip-flop 31.

It will be noted that targets Nos. 9 and 0 of the beam switching tube 27 are connected to one input grid 34 of the "and" gate coincidence circuit tube 35 which has also as a second input, an inverted and differentiated output from plate 12 of the "one shot" multivibrator 11. The coincidence of the negative pulse from the multivibrator and a negative going pulse potential from targets 9 and 0 occurs only during the start pulse interval. The result of this coincidence which occurs once only during the reception of each character is taken advantage of to provide a reset pulse for the flip-flop, the magnetic beam switching tube, and magnetic character reading cores of FIG. 6 as described hereafter. This reset circuit is defined by plate circuit 36 of tube 37 through condenser 38 and diode 39 to grid 40 of flip-flop counter 31 and through condenser 41 to the target output plates of the beam tube.

A further operation of the reset is necessary to provide for interruptions of the transmission for any reason. If such interruptions are of sufficient duration, the damped output of the ringing circuit at plate 26 of tube 25 will fall below the level necessary to operate the squaring circuit comprising tube 28. This condition is detected by an output from the ringing oscillator through condenser 42 to a thyratron 43 so connected with a diode rectifier 44 in its grid circuit as to allow the grid to drift positive with a decaying negative input. The firing of this thyratron operates the counter reset 36 through cathode follower action output 45, as previously described under the coincidence reset, and also operates the release and restoration to normal of other system circuits described later and which may have been in an off-normal condition due to failure to complete a posting cycle at the time of interruption. It will be understood that the large cathode resistor in the circuit of thyratron 43 causes this tube to be self-resetting.

It remains now to describe the output circuits of the distributor. Each of the six A to F targets 47, etc., of the beam switching tube 27 is connected through two condensers, for example, 49 and 50, to the two grids 51 and 52 of a double triode 53. It will be seen that these grids 51 and 52 are also connected through resistances 54 and 55 to contacts 8 and 7, respectively of polar relay 1, FIG. 3, these contacts being at a negative or at ground potential depending upon the position of polar relay tongue 6, that is, in a marking or a spacing position as determined by the line signals. It is thus obvious that one or the other of the grid pair 51 and 52 may correspondingly be biased to a value well below cutoff by the negative potential at the polar relay contacts 7 or 8 but that the other of the pair of grids will be at a higher potential as determined by the voltage divider resistances 56 and 57, 58 and 59. This higher potential is so adjusted that it is still below cutoff of tube 53 but if combined with a positive going pulse from target 47 of magnetic beam tube 27, then the corresponding plate 60 or 61 of tube 53 will be momentarily in a conducting state. Now by reference to FIG. 5 timing diagram it will be evident that target A, serial (2), goes positive at the instant that the beam is switched from target (2) to target B, serial (3), under control of the flip-flop tube 31 output "odd." Tube 53 will therefore repeat a pulse from target 47, serial (2), through its plate circuit 60 if the polar relay tongue indicates a "space" line signal or through plate circuit 61 if the polar relay tongue is on its "marking" contact. As the beam switching tube advances from target to target in close synchronism with the line signals, each double triode A to F in sequence transmits a pulse either on one or the other of its plates. The further decoding and utilization of these six mark and space plate signals will now be continued in connection with the code reader and translator of FIG. 6.

*Code reader and translator*

The code reader, FIG. 6, is in the form of a magnetic switching array or matrix comprised of magnetic cores 62, etc., with multiple coded windings 63, 64—one core for each character or digit to be read and from which the decoded output signal is derived. A second set of similar cores 65, etc., also with multiple coded windings, is utilized as a translator. The cores are preferably of the toroidal type as shown in FIG. 12, and of a magnetic material having substantially a rectangular hysteresis loop characteristic.

Each code reader core 62, etc., FIG. 6, is provided with seven separate windings, FIG. 12, these windings being designated as A to E, X and Y. The X coils are provided for the purpose of initially setting the magnetic polarity of the cores to saturation in a uniform direction—say N—prior to each character decoding cycle. The Y coils are provided for readout and are capable of transmitting a positive going voltage pulse on a N-P turnover of the flux in the core. The windings A to E, 63, 64, etc., are connected in series, as shown diagrammatically in FIG. 6, for the first letter character "W" with corresponding lettered coils of other character reading cores and through a pulse transformer winding 65 each to corresponding output leads A to E, 60, 61, etc., of the receiving distributor, FIG. 4, previously described. It is to be noted that the coils A to E of each core 62, etc., may be connected in the series circuits so as to drive the cores individually in the N to P direction with either a positive or a negative pulse. That is, each individual one of the windings 63, 64, etc., on each of the cores in the series circuits may be connected so as to provide a magnetizing force in one of two directions which may be designated as righthand "mark" or lefthand "space" windings, and which either will or will not reverse the polarity of the remanent magnetism in the core from N to P depending upon the direction of current in the coil, that is, either a positive or an negative pulse.

We therefore have provided a means of setting up a binary code series on the windings of each core with each of the five coils connected with windings in a righthand or lefthand direction such that the code for which the windings have been oriented, as represented by positive and negative pulses from the receiving distributor in sequence, will not cause an N to P turnover and therefore no output pulse from the Y (read-out) coil will result. On the other hand, any combination of positive and negative pulses other than the one for which the windings have been oriented will result in at least one magnetizing pulse in a direction to turn over the core from its initial N polarity and generate a pulse in the Y coil, there being one "Y" coil output lead for each core in the S, L, W . . . B commodity abbreviation series. Thus, a particular selection is made only when there is no output from the Y coil, and this method has substantial advantages in that only one coil per code element is required for each coded core, and no differential or balancing effect is required, so that more positive and less marginal operation is secured with a sequential series of code signals. It will be evident from FIG. 6 that there is a similar set of cores 66, etc., also with coils connected in series to read and discriminate as to the second series of code letters F to Z inclusive representing the option. In this case also windings are polarized so that all cores except the desired one are turned over at least once during a single character cycle of the distributor.

Having described the code reader which distinguishes significant letter character codes and is capable of selecting, by the absence of a pulse, one lead in each of two groups one corresponding to commodities and the other to monthly options, we will now describe the remaining decoding functions and the code translator.

Referring again to FIG. 6 and the previous discussion, we will assume that the code pulses for the letter W have been transmitted in sequence and that as a consequence core 62 remains in the N polarized or initial magnetized state and that all other cores such as 66, etc., have been turned over by at least one pulse to the P polarity. In turning over, that is, by reversing polarity, the Y windings 72, etc., have each transmitted a positive pulse over diode circuit 74, etc., to windings 76, etc., with the effect that cores 80, etc., have also been turned over and are restrained from subsequent reversal by the diodes 74 which otherwise might be occasioned by negative pulses following which may be generated in windings 72, etc. Winding 71 on core 62, however, has not been energized since it is on the core corresponding to W which by reason of coil windings conforming in direction to the code for the letter character W has received only negative or N polarizing signals. Consequently core 65 also remains in the N condition and is therefore distinguishable from all other cores by subsequent readout which occurs upon the incidence of the F interval pulse from pulse transformer F as follows.

Pulse transformer F, 81, in contrast with transformers A to E, is wound so as to transmit a positive pulse from the secondary with either primary winding 82 or 83 energized, such pulses being impressed on the grid 84 of tube 85. Tube 85 thereupon conducts, lowering the potential of plate 86 and thereby transmits a negative pulse through condenser 87, diode 88 and windings 89, etc., of cores 80. It will be recalled that only core 65 previously remained in the N condition, all others having been driven to the P polarity by one or more of the first five W character code selection signals. Now then at the sixth, or F, selection pulse interval, core 65 responds to the negative pulse and at that time turns over and generates a signal in all windings of core 65. One of these windings 92 is utilized to conduct a positive pulse to a thyratron 97, FIG. 7, conditioned to preselect one leg of a particular group of indicators as described in the following references to FIG. 7. Other windings such as 95, etc., are energized but their outputs are not utilized at this time, being a part of the figures translator to be described later.

In the circuit of FIG. 7 it will be noted that the grid 96 of thyratron 97 is connected through condenser 98 to the lead from core coil 92 which emits a positive pulse when core 65 is set from N to P. Also grid 96 is connected through resistance 99 to a source of negative bias in the program unit to be described later. If now this negative bias, normally of such a value that a positive pulse through condenser 98 will not fire the tube, is for the interval of a sixth pulse increased to a higher value which is slightly below cut-off, then a positive pulse superimposed will cause the thyratron 97 to break down and assume a conducting state and therefore will draw current in its plate circuit. This current flows from a positive potential source through a relay coil 100 and through a grid bus 101 which is designated as W corresponding to the ticker abbreviation for wheat. If therefore at the interval of the sixth selection pulse in the ticker code for W the bias on grid 96 is raised by the program unit, then the selection of bus W will be indicated by a current in coil 100 of relay 105.

In a similar manner it may be demonstrated that in the case of a code for the character Z following W, the thyratron 102 will fire thus drawing current through bus 103 and relay coil 104. It will now be observed that relay 105, FIG. 8, is equipped with two windings 100 and 104, one winding being connected to bus W through lead 106 and the other winding to bus Z through lead 107, and the relay is marginally adjusted so as to close a preliminary contact 167 with one coil 100 energized, but requires the combined magnetic flux produced by the current in both windings to operate fully and close the remaining contacts, then we have a means of completing the selection of indicator group WZ which may then receive a new price. It will be understood that one and only one relay such as 105 will be connected so as to have both windings energized simultaneously from both the W and Z busses. However, relays for controlling other option prices of commodity W may have one of their two windings energized and thereby close preliminary make contacts, but their second windings not being energized will fail to close their switching contacts to the respective indicator groups.

Further, it is apparent that by changing the connecting leads from the indicator group selector relays such as, for example, relay 105 and leads 106 or 107 to the busses such as 101 and 103 to other combinations of two busses, then any group of indicators may be made to respond to the price digit signals of any commodity option within the capacity of the equipment as determined by the number of discrete busses representing valid commodity options such as, for example, 108 or 109 provided in the system. By making these relay winding connections through plugs and jacks, a means of most expeditiously rearranging posted items to suit the needs of individual brokers is provided.

An additional control circuit is provided at each indicator group relay such as 105 which consists of a resistance such as 110 so disposed as to provide a signal to the program unit, to be described later, from the preliminary make contact 167 of the relay indicating that a valid first letter abbreviation has been decoded, and the second valid letter if following directly may be expected to complete the selection by operation of a group relay.

*Price display indicators*

We will now proceed to the description of the price indicator group operation. The preferred embodiment as hereinafter described comprises a group 111, FIG. 9, of individual numerical digit indicators for each item, as for example WZ, it being understood that these digit indicators 112, 113, etc. are so disposed as to display sequentially in adjacent horizontal rows in a vertical column a sufficient number, such as four, of the recent prices of the item or option to give a proper indication of the current trend. If desired, an index 114, shown at the left of each horizontal price row, may be employed and is illuminated to indicate the horizontal row of indicator lamps on which the latest of the current prices is being displayed, although the latest price also is indicated by the fact that a blank horizontal row follows in the sequence in which the prices are received and displayed.

Individual digit indicators preferably, although not necessarily, are of the type shown at 115, FIG. 9, consisting of twenty-one neon lamps designated as A1, A2, A3, B1, etc., which may be of a commercial type NE-96, arranged in a 5 x 9 element mosaic, modified by the omission of twenty-four lamps not required for a numerical character display as represented by the blank or undesignated areas in the mosaic 115 (FIG. 9). These lamps are characterized by a triggering or firing potential of, say from 125 to 150 volts, but once fired they remain conducting and lighted down to a lower potential of, say, 75 to 95 volts average. The lamps are connected to a normal holding intermediate potential, say, 108 volts, through suitable current limiting resistors, and may be triggered or fired by momentarily connecting to a higher potential, after which they remain lighted and conducting current so long as the intermediate or holding voltage is sustained.

Referring to FIG. 9, an implementation of this principle is shown whereby the neon lamps may be fired individually in groups of three such as A1, A2, A3, to form mosaic decimal figures from 1 to 9 and 0 as, for example, at 116 and 117, etc. In each digit mosaic twenty-one lamps are employed which are connected in seven groups of three lamps and designated A to G corresponding to the indicator code, FIG. 1. Although various arrangements may be used, in the example shown the three lamps A1, A2 and A3 are connected so as to fire simultaneously from one circuit, and likewise B1, B2, B3, etc. A similar arrangement is shown in U.S. Patent 2,146,576 to Haselton et al., entitled "Annunciator."

Cooperating with and connected to the neon lamps in one group of twenty digit indicators, in five rows arranged to display four successive current prices, with a blank row following the last price, for one item or option as shown for WZ, is a multiple bank rotary switch 118, having seven banks or wiper levels 119, 120, etc., designated A to G inclusive corresponding with the indicator setting code, and each bank with twenty-five successive contacts. It will be seen from the diagram that the successive contact points of each bank are arranged to be connected to similarly lettered groups of neons A, B, C, etc., and that as the switch is stepped and negative firing voltages are applied simultaneously to the wipers as at 119, 120, etc., then the neons forming each digit may be simultaneously fired. For example, on all seven banks the contact points numbered 1 to 4 inclusive are wired to control the firing of all neons in the four digits of the topmost horizontal price row. Likewise contacts 6 to 9 control the second horizontal row of digits, etc.

It is to be further noted that the stepping switch is caused to stop momentarily on bank contacts numbered 5, 10, 15, etc., and that on bank A these points are connected to a single lamp 114 for each row which constitutes the illumination for the index arrow of the last price received. A further connection to points 5, 10, 15, etc. is made through bank G, wiper 123, which is used to apply a negative pulse to common anode resistors such as 121, 122, etc., and thereby momentarily reduce the positive supply voltage to all neons in the horizontal row which is next to be reset, in order to extinguish the previously displayed price in that row.

It is also to be noted that in the circuit shown the neon lamps are normally connected to a source of approximately 108 volts positive through individual 33K resistances 126, 127, etc., and are grounded through 16K resistances 128, etc., which is common to three neons. The firing is then positively and practically instantaneously accomplished by applying a negative pulse of approximately 90 volts to the common connection of three neons through the switch points, as described in the following paragraphs.

It will now be demonstrated how price digit ticker signals following a valid two letter item abbreviation are decoded, translated and caused to impress the proper combination of negative pulses on the wipers A to G of the indicator group sequence switches such as 118 through the contacts of a group selector relay as 105.

It will be recalled that the character decoder, FIG. 6, composed of multiwound cores 62, etc., was utilized to indicate a selected character by one unique core on which all windings were polarized or oriented so as to produce flux only in the negative going direction during the reception of a character in accordance with the code marking and spacing pulses. It will also be evident from code chart, FIG. 1, that the first five of the line signal selection code units A to A are repeated for letters and figures case and that the distinguishing code unit is the sixth, or F, interval pulse. One of the features of this invention takes advantage of this characteristic of the ticker code to simplify the code reader and code translator. In the previous description of the circuits associated with the translator, FIG. 6, it was stated that certain windings such as 95 on core 65 were used in the figures translation but not for the letters. That is, common core windings are used for decoding letters and figures, but two sets of output windings are provided of which one or the other is used depending upon whether the sixth selection pulse is marking or spacing in character. For example, in FIG. 6 it will be seen that core 62 is used both to decode the letter W and also the figures fraction ½ (or ⅜). On corresponding core 65 there is a letters character read-out coil 92 and also four figures character read-out coils 95, 129, 130 and 131.

The manner of utilization of the coil 92 has previously been described and now it will be shown how the coils 95, 129, 130 and 131 are connected to the proper combinations of multiple leads lettered A to G inclusive, in order to transmit pulses through amplifier tubes 132, 133, etc., FIG. 8, and contacts of a group selection relay as 105 and rotary switch banks A to G, switch 118 to the selected group of price display indicators. By reference to code chart FIG. 1 it will be seen that the display indicator code for the fraction ½, which is displayed as a 4, indicative of eighths, comprises code elements A, C, D and G. Accordingly the four core translator coils on core 65 are shown in FIG. 6 connected to corresponding indicator code multiple wires, and when the core 65 turns over during the F selection pulse interval, positive pulses are transmitted by the multiples designated A, C, D and G to the grids of amplifier tubes 132, 133, 134 and 135, through condensers 136, 137, 138 and 139, respectively. If now these grids are conditioned for the duration of the sixth, or F, pulse by a decrease in the marginal negative bias applied from the program unit through control lead 140 and grid resistors 141, 142, 143 and 144, then these four tubes will reflect the grid pulses by a momentary drop in plate potential. Coupling condensers 145, 146, 147 and 148 are connected through diode 149, 150, 151 and 152 and contacts 153, 154, 155 and 156 of indicator group relays, such as 105, FIG. 8, to corresponding wipers of a rotary sequence switch 118, FIG. 9, and amplified negative going pulses are thus applied to fire neon groups A, C, D and G to display the figure 4.

It is obvious that for posting other price digits, cores such as 80, FIG. 6, are provided to transmit other combinations of display codes as determined by the number and connections of the windings. It will be understood that codes for four price digits in sequence are received and displayed following each valid two-letter commodity option combination and that the firing pulses for the four digits are routed to their proper display positions from left to right in the order received over the ticker circuit by the rotary stepping sequence switch previously described.

Having thus described the operation of the several functional circuits, it remains to describe the programming unit, FIG. 10, which initiates the various switching and control signals to the integrated system.

*Programming unit*

Preparatory to describing the operation of the programmer, which by reference to FIG. 10 will be seen to consist of an intimate association of electronic and relay circuits, the basic operational cycles and switching sequence will now be reviewed and listed below. Reference may also be had to the timing diagram of FIG. 11. A cycle as referred to here is understood to be a discrete programming step generally initiated by a line character signal "start."

Cycle I:
(a) With all circuits in a normal or rest condition and with the incidence of a "start" signal,
(b) scan each character code for valid 1st letter abbreviation of a posted item and
(c1) if recognized then decode and
(c2) transmit enabling signal to 1st letter register thyratrons to
(c3) energize one winding to selected item relays closing preliminary make contacts, which
(c4) sets up preparatory signal in programmer to anticipate 2nd letter.
or (d) if no valid 1st letter recognized, then
(d2) restore all circuits to rest condition I(a).
(e) Restore magnetic reading and decoding cores to normal.

Cycle II:
(a) With 2nd letter preparatory signal indicated and with "start" signal,
(b) scan next succeeding character code for valid 2nd letter abbreviation of a posted option and
(c1) if recognized then decode and
(c2) transmit enabling signal to 2nd letter register thyratrons to
(c3) energize second winding and fully operate selected option relay and close all contacts, which
(c4) sets up price preparatory signal in programmer to anticipate price number code to follow.
or (d1) if valid 2nd letter is not recognized immediately following, then
(d2) restore all circuits to rest condition I(a).
(e) Restore magnetic reading and decoding cores to normal.

Cycle III:
(a) With price preparatory signal in programmer with "start" signal,
(b) scan next succeeding character for a price number code which includes a "marking" pulse during the F interval, and
(c1) if a marking F pulse is recognized then decode and
(c2) transmit an enabling signal to the indicator price code pulse amplifiers to
(c3) set 1st digit price indicators by firing selected neons.
(c4) Operate indicator sequence switch to 2nd digit of price.
or (d1) if a marking pulse in F interval is not present then
(d2) restore all circuits to rest condition I(a).
(e) Restore all magnetic cores to normal.

Cycles IV and V each repeats Cycle III for posting 2nd and 3rd digit of price except omit (d1) and (d2).

Cycle VI repeats Cycle V for posting 4th digit of price except for step (c4) as follows:
(c4) operate indicator sequence switch to 5th point which signals programmer to initiate release Cycle VII.

Cycle VII:
(a) With release signal in programmer,
(b) transmit negative pulse through bank G of indicator sequence switch to extinguish neons in next succeeding row of indicators,
(c) transmit negative pulse through bank A of indicator sequence switch to fire index marker neon,
(d) operate indicator sequence switch to 6th point, and
(e) release all circuits to rest condition I(a).

In addition to the above seven cycles, all of which are initiated by a succession of "start" line pulses, reference is made here to the foregoing description of the receiving distributor counter reset circuit which operates to clear all partially completed program operations and restore all circuits to the initial rest condition I(a) if for any reason there is an interruption in the line signals longer than a predetermined value.

By reference to FIGS. 10 and 11 the detailed operation of the programming unit will now be described. The grid bias for the 1st letter register thyratrons, such as 97, FIG. 7, is supplied through grid resistors 99, etc., plate resistance 157, FIG. 10, and plate 158 of tube 159 which is normally conducting thereby maintaining the thyratron grids at a potential so adjusted to a negative value by resistance 160 as to be insensitive to positive pulses from the translator core coils 92, etc., FIG. 6. The grid 161 of tube 159 is held at a positive potential with reference to cathode 162 by the forward current in two diodes 163 and 164 which are arranged to provide an "and" gate circuit, that is, the potential across both 163 and 164 must be negative, otherwise current will flow from the positive through one or both of diodes 163 and 164 in the forward direction and cause a potential drop across grid resistance 165 thereby maintaining a positive bias.

The conditions for enabling the 1st letter register thyratrons are:

[a] The system must be operating in Cycle I.
[b] The polar relay must indicate a spacing pulse, and
[c] The distributor counter must be on target F.

These conditions are satisfied and grid 161 goes negative when the following three impulses to the programmer are negative.

From diode 163 through grid resistor 164 to negative and also to a parallel circuit through voltage divider resistance 177 to diode 166, FIG. 8, current limiting resistor 110 to preliminary make contact 167 which is open during Cycle I, but is also connected to the 2nd letter selector bus 103 which during Cycle I has only the non-conducting plates of a thyratron 102, FIG. 7, connected thereto. The potential at diode 163 being therefore negative in the forward direction, no current flows in this circuit and condition [a] above is satisfied.

From diode 164 a circuit through lead 168 to a secondary "and" gate comprising diodes 169 and 170. Diode 169 is connected through lead 171 to the marking contact 7 of polar relay 1 of FIG. 3, this contact being at a negative potential during a spacing line signal. Therefore, condition [b] above is satisfied. From diode 170 a circuit extends to the cathode follower resistance 173 of tube 174, FIG. 4. The grid of tube 174 being connected to target F goes negative during pulse interval F and by cathode follower action reduces the potential drop across resistance 173 and consequently lowers the potential across diode 170, FIG. 10, in the forward direction. As both diodes 169 and 170 receive a negative forward impulse, lead 168 also becomes negative and hence diode 164 fails to conduct. Condition [c] above is therefore satisfied and tube 159 cuts off with a consequent increase in the 1st letter thyratron register bias at grid 96, FIG. 7, which is supplied through plate resistor 157. Thereupon assuming that the letter W has been read and decoded, the position pulse from read-out coil 92, FIG. 6, during the F interval fires thyratron 97, FIG. 7, and energizes coil 100 of relay 105, FIG. 8, which in turn closes preliminary make contact 167 through relay coil 104 to positive potential. This positive potential is reflected through resistor 110, diode 166, resistance 177, FIG. 10, to diode 163 and grid 161 of tube 159, returning this tube to a normal conducting state regardless of the condition of the other leg of the "and" gate diode 164.

This positive voltage from the preliminary make of a partially operated item selector relay such as 105 also acts to raise the grid 166 of inverter tube 167. As this tube conducts the current in resistor 168 lowers the potential across voltage divider 169 and 170 thereby providing diode 171 with a lowered forward potential, this being the preparatory signal in the programmer for Cycle II to follow. It should be here noted that this preparatory signal before inversion is also applied over lead 172 to diode 173 which is in one leg of the "and" gate controlling grid 175 of gating pentode 176, a flip-flop driver the functions of which will be explained later.

Progressing now to Cycle II, the first step is to reset to normal all magnetic cores comprising the decoder-translator of FIG. 6. The reset is initiated as a negative going pulse at plate 36 of tube 37, FIG. 3, as previously explained, which is introduced through condenser 41, FIG. 4, to grid 178 of tube 179, FIG. 10. This negative input causes tube 179 to cut off sharply and induces a positive going pulse at the plate 180 which is transmitted through condenser 181 and diode 182 to "X" coils 183, 184, etc., thereby resetting all cores to normal, which it will be recalled was defined as a magnetic saturation in the N direction. It may be noted that this resetting which is coincidental with the resetting of the receiving distributor elements is recurrent at the beginning of each cycle midway during the "start" pulse interval.

Second letter register thyratrons, as for example 102, FIG. 7, are enabled during Cycle II, that is, their grid potential is raised to nearly the firing level by the plate circuit 185 of tube 186, FIG. 10. This latter tube functions during the pulse interval F of Cycle II exactly as tube 159 during Cycle I as determined by the inversion of the preparatory signal on diodes 163 and 171 of the "and" grid gates.

During the F pulse interval, Cycle II, a flip-flop circuit comprising tubes 187 and 188 is set "on" to guard against the possibility of a valid 2nd letter not being received and decoded during Cycle II. This flip-flop is immediately restored to normal "off" following the operation of an item selector relay, but if no such relay operates at this time then the entire system is recycled to condition I(a). The flip-flop consists of the triodes 187 and 188 in conventional circuit arrangement which is triggered and reset by negative pulse to respective plates 189 and 190. The set "on" pulse is supplied through plate dropping resistor 191 of gating pentode 176, through coupling condenser 192 and diode 193. The suppressor grid 194 of tube 176, which is normally conducting, is held positive during Cycle II by its connection to resistor 195. The grid 175 of flip-flop driver 176 as previously mentioned also requires in order to pass a pulse, a positive potential at diode 173 indicative of Cycle II and coincidentally a positive pulse at diode 252, the other arm of the "and" gate, which pulse occurs when grid circuit 84 of tube 85, FIG. 6, conducts during interval F of the distributor cycle. Therefore, the flip-flop is set "on" only during interval F of Cycle II, being held "off" during Cycle III and subsequent cycles of the suppressor grid 194 which is connected through lead 196 to relay contact 197 of relay 105, FIG. 8, and thence to negative potential.

If now when relay contact 197 closes during or immediately following Cycle II, the negative preparatory signal for Cycle III, returning over lead 196, is transmitted through condenser 197 and diode 198 to the plate 190 of flip-flop counter tube 188, thus resetting the flip-flop "off" to its normal state. If, however, following Cycle II no item relay is operated and consequently flip-flop plate 189 remains negative, the grid bias resistor 199 remains negative. This grid circuit is connected through lead 200 and diode 201 to one side of an "and" gating circuit 201, 202, the other gate controlling input being through diode 202 and lead 203 to cathode follower resistor 204 of tube 205, FIG. 4. Tube 205 in turn has its grid controlled by a connection to target C of the beam counter tube 27. If therefore at the time of the leading edge of the C pulse interval, Cycle III, the flip-flop has not been reset by an item relay operation, then as a consequence the diode gate opens and grid 206 of tube 207 goes negative and transmits a negative pulse from cathode follower 208 and through condenser 248 to grid 209 of tube 210. This negative pulse is inverted and amplified through plate circuit 211 and impressed over lead 212 and condensers 213, etc., to the cathode 214 of all register thyratrons 97, 102, etc. As will be evident, this strong positive pulse to the cathode circuit extinguishes all the thyratrons to return them to their normal I(a) cycle condition. If however before interval F, Cycle III, an item relay has operated and the flip-flop has reset, then the sequence of operations is allowed to proceed.

The enabling signal to the price posting amplifier tubes 132, 133, etc., FIG. 8, is provided by connecting their grids through resistances 141, 142, etc., and through lead 140 to the plate 216 of tube 217 and also to a negative biasing resistor 218. Grid 219 is controlled by an "and" diode gate such that three simultaneous negative inputs are required to cut off the tube. The first diode 220 goes negative when any item selector relay operates, thereby closing lead 196 to a negative source through contact 197 of relay 105. The second diode 221 goes negative during the F pulse interval, being connected to cathode follower resistance 173, FIG. 4, previously described. The third diode 222 of the grid 219 gate is connected to the spacing contact 8 of polar relay 1, FIG. 3, which goes negative on a marking pulse. Tube 217 is therefore cut off during marking F intervals of Cycle III and subsequent Cycles IV, V and VI. These are recognized as the times during which the four successive digits of the new price are posted, by enabling of the amplifier tubes 132, 133, etc.

The positive going signal at the trailing edge of the enabling signal from plate 216 of tube 217 is also transmitted through condenser 223 to grid 224 of thyratron 225. As thyratron 225 fires, relay 226 is operated closing contact 227 which is in the stepping magnet winding 228 of a rotary stepping indicator sequence switch 118 of FIG. 9. The pawl 229 of this switch is operated to step the switch upon the release of relay 226, FIG. 10, which occurs due to the opening of the self-interrupting contact 230 in the thyratron 225 plate circuit. By this means the four indicators of a horizontal row comprising one price are connected in sequence through successive points on the switch during Cycles III, IV, V and VI.

In the event that two significant letter characters comprising an item abbreviation are not followed directly by a numerical character code, including a sixth pulse marking, a guard circuit is provided to release the first and second letter selector registers thus interrupting the posting sequence and restoring all circuits to the initial or rest condition Cycle I(a).

This release operation is initiated by a momentary cut-off pulse through tube 207, FIG. 10, which is normally conducting due to both grid 206 and suppressor grid 253 being held positive. If now during pulse interval F, Cycle III, tongue 6 of the polar relay 1, FIG. 3, leaves its marking contact 7, then tube 186, FIG. 10, cuts off as previously explained under Cycle II operation. Cathode follower resistance 255 thereupon also goes negative and transmits a negative pulse through condenser 256, diode 257 to suppressor grid 253 of tube 207. By cathode follower action 208 a negative pulse is generated in grid 209 of tube 210 which as previously described extinguishes the thyratron registers and returns all selection circuits to their initial condition Cycle I(a).

As the switch bank wipers 119, 120, FIG. 9, engage points numbered 5, 10, 15, etc., at the end of posting Cycle VI and after completion of the four (fractions) digit posting, three final operations are initiated. First, through bank G, point 5, a positive voltage from neon anode resistor 122 may be traced through wiper 123 and relay contact 156 of relay 105, FIG. 9, through lead 231, FIG. 10, condenser 232, diode 233 to grid 234 of thyratron 235. This thyratron has its plate resistor 236 connected through condenser 237, diode 238 back to lead 231. As the thyratron fires it transmits a negative pulse through the above circuit to neon anode resistor 121 thereby causing all neons in the next succeeding price row to be extinguished, their anode voltage supply being through resistor 122. The negative pulse at plate resistor 236 is also impressed through condenser 239 to grid 209 of tube 210, which operation causes the first and second letter register thyratrons to be turned off as previously described.

A third circuit from the plate resistor 236 of thyratron 235, FIG. 10, is effective in transmitting a negative pulse through condenser 240, diode 241, lead 242, relay contact 153, bank A, point 5, of sequence switch to the cathode resistor 243 of index indicator neon 114, which thereupon is turned on, its anode being connected to the next succeeding anode resistor and point 10 on the sequence switch bank G.

A final step of Cycle VI is to step the sequence switch from point 5 to point 6 of the group 6 to 10, and otherwise restore all circuits to their initial starting condition. This is accomplished by means of a positive pulse from cathode 244 of thyratron 235, FIG. 10, via condenser 245 to grid 224 of thyratron 225. This tube, it will be recalled, steps the indicator sequence switch and through self-interrupting contact 230 turns thyratron 225 off. Also a second interrupting contact 246 turns thyratron 235 off. This completes the posting sequence with all selection equipments and circuits released to the normal condition, Cycle I(a), ready for the next price posting and with the sequence switch resting on point 6.

Should the transmission be interrupted for any reason without completion of the posting sequence, a circuit is provided from the plate of tube 43, FIG. 4, through condenser 248 and lead 247 to cathode 208 of tube 207 which after a predetermined interval, as previously explained, initiates the release functions including the reset of flip-flop circuit 187, 188 by a negative pulse to the plate 190 of tube 188, through condenser 249 and diode 250.

In the event that a price is transmitted which does not include a fractions value, a figures dot is inserted in lieu thereof by the transmitting operator, which causes the fractions indicator to remain blank, i.e., deenergized, and also causes the rotary switch to step to the next point. For brevity, the term "quotation" is employed in a generic sense to define the naming of the price or value of a commodity, security or other item posted, and also the price or value thus named. Various novel and improved features in regard to the electronic receiving distributor control, resetting and phasing circuits are not claimed in this application since they represent the invention of others than the inventors named herein.

The foregoing description relates to one illustrative embodiment of the invention, but it will be obvious to those skilled in the art that various equivalents, extensions and variations are possible as to the circuits and equipments disclosed, and still embody the essential functions and features of the system. The invention therefore is not to be regarded as limited except as indicated by the scope of the appended claims.

What is claimed is:

1. A compatible ticker and automatic quotation board system, comprising a ticker circuit over which are received start-stop permutation code characters of the type adapted to operate a ticker for printing on a tape characters representing any one of a preselected group of current quotations relating to commodities or other quoted items as well as for printing messages consisting of information other than such quotations and interspersed with the quotations, the quotation board embodying indicator devices respectively assigned to said quoted items and energizable to display the quotations relating thereto, and means operatively associated with the quotation board to enable the quotation board to distinguish between quotations to be displayed by its indicator devices and said messages which are not to be displayed thereon, said last named means comprising a reading circuit responsive solely to the characters of said preselected group of current quotations, means controlled thereby for selecting and energizing the proper indicator devices to display said quotations when received, and including means for preventing inadvertent energization of the indicator devices when the characters incoming over the ticker circuit represent said messages.

2. Automatic quotation board apparatus embodying indicator devices arranged in groups respectively assigned to commodities or other quoted items for displaying quotations pertaining thereto, a ticker circuit comprising a source of incoming start-stop permutation code character signals of the type adapted to operate a ticker for printing the quotations on a tape and also messages consisting of information other than such quotations and interspersed with said quotations, each quotation comprising a predetermined number of successive letters characters identifying a particular item followed by a plurality of figures characters representing the quoted price thereof, said apparatus including means for selecting the proper indicator groups and energizing the indicators of the selected groups for displaying the quoted prices of said items, a reading circuit for sensing each character signal as received, means controlled by said reading circuit for operating said selection means to effect selection and energization of a particular indicator group only when the combination of said predetermined number of successive letters characters identifying a quoted item followed by at least one figures character of the price is sensed by said reading circuit, and including means for preventing the energization of any of said indicator groups when the received characters represent said messages instead of said quotations.

3. Apparatus according to claim 2, including means for energizing the indicator devices in a selected item group to display the price represented by the currently received figures characters pertaining thereto, the group selection means including switching means individual to each item for connecting circuits to the selected indicator devices for energizing the devices, and means for preventing the energization of said circuits when the groups of received characters represent said interspersed messages instead of said quotations.

4. Apparatus according to claim 3, in which each indicator group includes a plurality of adjacent rows of indicating devices arranged in a column, each row comprising a number of indicating devices respectively for displaying the digits representing a price of the item designated by the group, there being at least three adjacent rows of indicators in each item group to give a significant indication of the current price trend of the item, means for energizing said adjacent rows of indicators in succession as successive prices of the item are received and for maintaining the indicators energized to display the current price trend, and including means for automatically deleting a price previously displayed on a row of indicators following in successive order the row in which the most recent price is displayed.

5. Automatic quotation board apparatus embodying rows of indicator devices arranged in groups respectively assigned to commodities or other quoted items for displaying quotations pertaining thereto, a ticker circuit comprising a source of incoming start-stop permutation code character signals of the type adapted to operate a ticker for printing the quotations on a tape and also messages consisting of information other than said quotations and interspersed with said quotations, each quotation comprising a predetermined number of successive letters characters identifying a particular item followed by a plurality of figures characters representing the quoted price thereof, said apparatus including means for selecting the proper indicator groups respectively identified with said quoted items to be displayed, a reading circuit for sensing each character signal as received, storage means operable by said reading circuit to store a signal representing the received character, said storage means including means for operating said selection means only when said predetermined number of successive letters characters identifying one of the quoted items is received and including switching means for partially preparing energizing circuits to a particular row of indicator devices in the selected group, means operative when at least one figures character following said letters characters is received for completing said energizing circuits successively to the indicator devices of the selected row, means operative to return said storage means to its original condition when a letters character is received after said predetermined number of successive letters characters, and means for preventing the energization of any of said indicator devices when the received characters represent said messages instead of said quotations.

6. Automatic quotation board apparatus embodying indicator devices arranged in groups respectively assigned to commodities or other quoted items for displaying quotations pertaining thereto, a ticker circuit comprising a source of incoming start-stop permutation code character signals of the type adapted to operate a ticker for printing the quotations on a tape and also messages consisting of information other than said quotations interspersed with said quotations, each said character signal including a case-determining pulse either of spacing or marking significance depending upon whether the character is a letters character or a figures character, said apparatus including means for selecting and energizing the proper indicator groups for displaying the quoted prices of said items, a reading circuit for sensing said case-determining pulse in each character signal as received, circuit elements controlled by said reading circuit for operating said means for selecting and energizing the proper indicator groups only when the received character signals represent figure character quotations to be displayed by the board, and means including said reading circuit for preventing the inadvertent energization of any of said indicator devices when the received character signals represent said interspersed messages.

7. A data posting system for displaying information in regard to a plurality of different items, comprising indicators arranged in groups each individual to a particular posted item, each group comprising a plurality of adjacent rows of indicators for displaying successive numerical values of an item, circuits for energizing said indicators and selection circuits for connecting a selected row of indicators of a selected item group to the energization circuits, a source of groups of incoming start-stop permutation code character signals including signals comprising a predetermined number of selection letters characters identifying a particular posted item followed by figures characters representing the value thereof, means including a circuit for sensing the first character after the start signal of each incoming group to determine whether the first character represents a valid first letter item selection character, electronic register devices, means operative when a valid first letter item selection character is sensed for energizing one of said register devices, means controlled by the energized register device for partially preparing the said energization circuits for the indicators individual to that item, and means operative when an invalid letter item selection character is sensed for returning the energization circuits to their original starting condition.

8. A system according to claim 7, including means operative when at least one other valid letter item selection character following said first letter selection character is sensed for energizing another of the electronic register devices, means controlled by the said another energized register device for completing the preparation of the energizing circuits for the indicators, and means operative when no said other valid letter item selection character is sensed for returning the energization circuits to their original starting condition.

9. A system according to claim 8, including means for sensing the character immediately following said other valid item selection character, means operative if a figures character is thus sensed to energize the first indicator in a selected row of indicators and cause it to display the corresponding figures character, and means operative when no figures character is thus sensed for returning the energization circuits to their original starting condition.

10. A system according to claim 9, including means operative when each indicator in a selected row has been energized for switching said energizing circuits successively to the following indicators of that row in preparation for successive energization in accordance with the figures characters in the incoming group of signals.

References Cited in the file of this patent
UNITED STATES PATENTS

| | | |
|---|---|---|
| 1,872,126 | Daine et al. | Aug. 16, 1932 |
| 1,890,878 | Haselton et al. | Dec. 13, 1932 |
| 1,972,341 | Hoover et al. | Sept. 4, 1934 |
| 2,056,452 | Hoover et al. | Oct. 6, 1936 |
| 2,146,576 | Haselton et al. | Feb. 7, 1939 |
| 2,182,355 | Rustad et al. | Dec. 5, 1939 |
| 2,318,168 | Lang | May 4, 1943 |
| 2,349,304 | Potts | May 23, 1944 |
| 2,691,155 | Rosenberg et al. | Oct. 5, 1954 |
| 2,727,222 | Bush | Dec. 13, 1955 |
| 2,782,399 | Rajchman | Feb. 19, 1957 |